Sept. 2, 1969  W. TRANKNER  3,464,339
PHOTOGRAPHIC CAMERA
Filed May 12, 1967  2 Sheets-Sheet 2
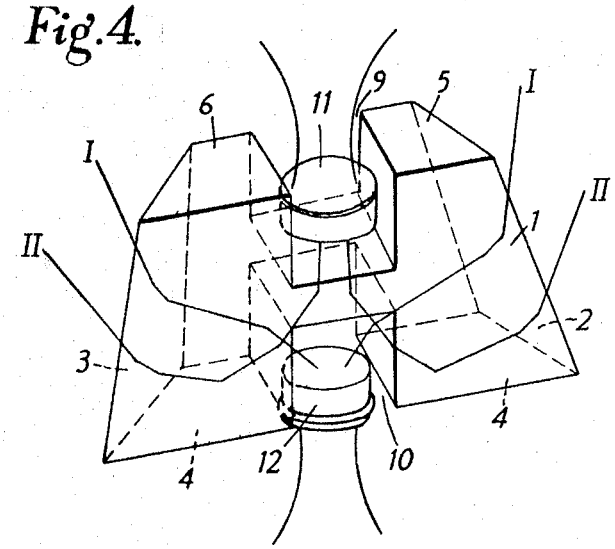
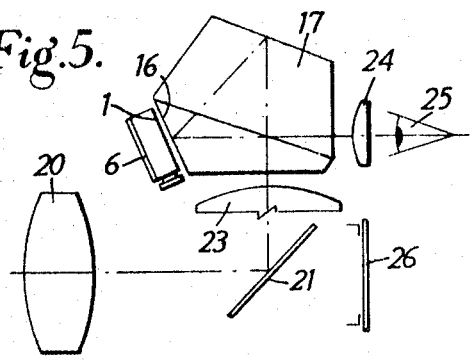
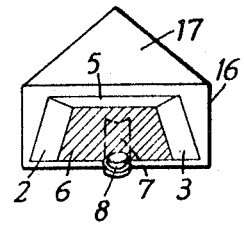
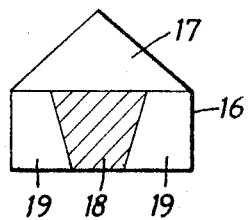
INVENTOR
WERNER TRANKNER
BY Young + Thompson
ATTYS

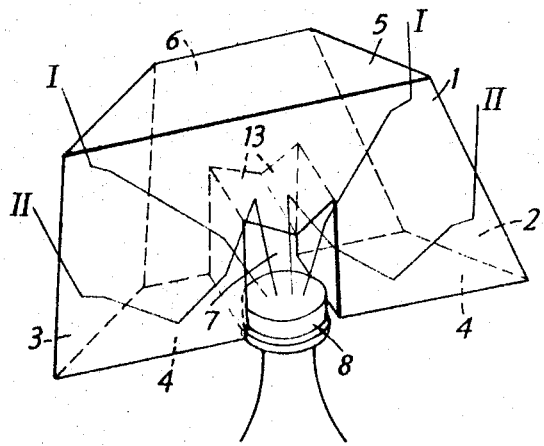
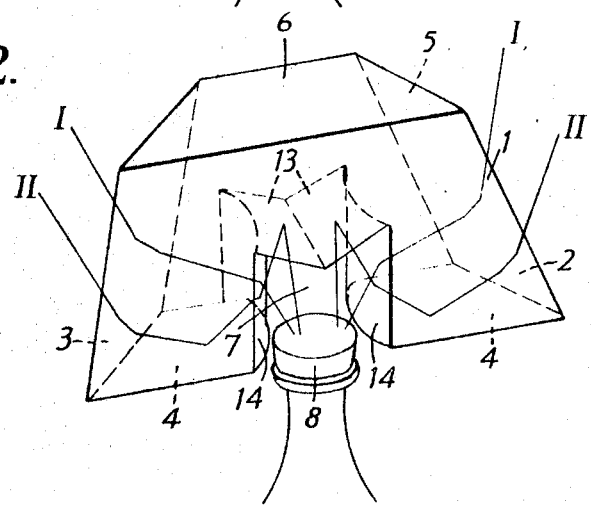
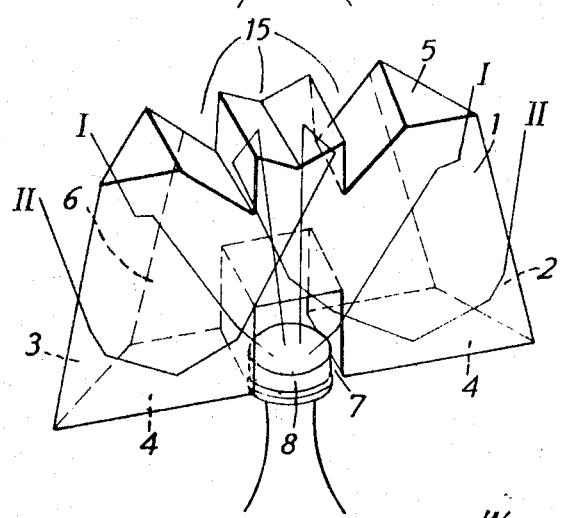

3,464,339
PHOTOGRAPHIC CAMERA
Werner Trankner, Dresden, Germany, assignor to VEB Pentacon Dresden Kamera- und Kinowerke, Dresden, Germany
Filed May 12, 1967, Ser. No. 638,018
Int. Cl. G03b 19/12
U.S. Cl. 95—42                                                                 10 Claims

ABSTRACT OF THE DISCLOSURE

A light guide collector body of prismatic shape which receives light from the pentaprism of a reflex camera and transfers it to one or more photo-electric cells. This arrangement is designed to enable the bright and dark parts of the ground glass screen image, as well as their contrast range, to be measured both singly and jointly. The light collector body has a light entry surface and one or more light exit surfaces. The light entering the body is split into two beams and after multiple reflections can be sensed by the photo-electric cells to determine the correct exposure.

---

The invention relates to a light collector body for photo-electric exposure meters, particularly for photographic reflex cameras with image deflecting mirror or prism systems.

Photo-electric exposure meters are known by which, for example, the light coming from an objective lens is guided onto a photo-electric measuring cell or a photo-resistor. A light guide body for this purpose can be prismatic, pyramidal or conical, with plane, convex or concave surfaces, and consist of an organic or inorganic material permeable to light and with high refractive properties. Funnel-shaped internally mirror-coated light guide bodies of which the light entry surfaces differ from the light exit surfaces are likewise capable of collecting or concentrating the light flux entering the body in question and of guiding it to a photo-electric converter provided beyond the light exit surface.

These light guide bodies, in conjunction with photo-electric exposure meters, are frequently used both for the taking of pictures, with photographic and cinematographic cameras, particularly when the latter are equipped with reflex view finder systems and for projectors. Particularly in single-lens reflex cameras, various arrangements of light guide bodies are known, the purpose of these arrangements being to guide the light flux coming from the objective lens onto a photo-electric cell and frequently to guide only part of the said flux. With the exposure meters which have so far become known or been proposed, with or without light guiding means, there is always a dependence between the brightness of the viewfinder image and the amount of light reaching the photo-electric cell.

To ensure an optimum measuring result and satisfactory observation of the viewfinder image it is important that in addition to an adequate measuring light beam, which in many cases is reflected from the viewfinder light beam, the viewfinder image should remain sufficiently bright when the diaphragm is open. In addition, its desirable that the measuring light beam should be separated from the entire viewfinder light beam sufficiently to ensure that on the one hand the illumination intensity for the measuring and the illumination intensity in the film plane must bear a constant ratio to each other with a given diaphragm, no matter what lenses are used, while on the other hand, owing to the diffuse character of the light emanating from the image on the ground glass screen, and a constant quantity of light in relation to the light intensity entering, at every diaphragm setting, it is necessary to obtain measuring values which are always in proportion to the light incidence values of the lens and which are in addition free of extraneous light.

With the known internal exposure meters in reflex cameras, the light guiding means used therein transport parts of the light beam which emanate either directly from the viewfinder light beam or the objective lens light beam and/or from the ground glass screen image. The results which have hitherto become known have shown that the brightness of the viewfinder image, due to the measuring light beam, is not completely satisfactory, owing to partly mirror-coated reflecting surfaces which play a part in the structure of the viewfinder image, on the one hand, and owing to the more or less considerable dispersion circle of the ground glass screen, on the other hand.

Summary of the invention

According to the present invention there is provided a light collector body of prismatic shape, consisting of one piece and having a light entry surface, at least one light exit surface and a plurality of reflection surfaces inclined differently from one another relative to the light entry surface whereby part of the light entering said light entry surface is directed by a single reflection from one of said plurality of reflection surfaces towards the light exit surface whereas the remaining light entering said light entry surface is directed towards said exit surface or a further exit surface after multiple reflection from more than one of said plurality of surfaces.

Further according to the invention there is provided in a single-lens reflex photographic camera having an objective lens, a pivotable mirror on the optical axis of the objective lens, a pentaprism, an image erecting on the pentaprism, an eyepiece and a photo-electric converter, the provision of a light collector body between the image erecting surface and the photo-electric converter, the body consisting of one piece and having a light entry surface, at least one light exit surface and a plurality of reflection surfaces inclined differently from one another relative to the light entry surface whereby part of the light entering said light entry surface is directed by a single reflection from one of said plurality of reflection surfaces towards the light exit surface whereas the remaining light entering said light entry surface is directed towards said exit surface or a further exit surface after multiple reflection from more than one of said plurality of surfaces.

The light collector body is preferably constructed as a polygonal prism bar of columnar, pyramidal or conical shape, preferably with a trapezoidal cross section, in addition to which, starting from the base surface of the light guide body, and between the light entry surface and the rear surface, a U-shaped cavity is provided for a purpose of accommodating the photo-electric converter. To enable two photo-electric converters to be accommodated inside the light collector body, both the base surface and the top surface of the body are each provided with a cavity, the cavities being situated opposite to each other.

The U-shaped cavity may be provided either with mirror-coated or with totally reflecting top surfaces. Instead of providing the cavity with a top surface, a minimum of three saddle roof type recesses with mirror-coated or totally reflecting surfaces may be provided on the upper surface of the collector body, which surface may be tapering. Finally, the light exit surfaces of the U-shaped cavities may be spherically, aspherically or cylindrically curved.

Insofar as the light collector body is used particularly for internal exposure measuring purposes in photographic reflex cameras with an image deflecting mirror system or prism system, the light entry surface of the light collector body is situated with or without an air gap behind non-mirror-coated and non-lacquered surface parts of the image erecting surface of the pentaprism, which are positioned to the right and to the left of a central part of the image erecting surface.

To ensure that no false light or extraneous light, particularly emanating from the eyepiece, can reach the photo-electric converter, that prism surface of the light collector body which is situated opposite to the light entry surface is covered over with a black material.

Brief description of the drawings

Constructional embodiments of the present invention will now be described, by way of example, with reference to the accompanying drawings, wherein:

FIGS. 1, 2 and 3 show a prism bar as a light collector body, with trapezoidal surfaces and with a U-shaped hollow space for accommodating the photo-electric converter;

FIG. 4 shows the same trapezoidal prism, with two photo-electric converters;

FIG. 5 shows a reflex viewfinder device with a roof type pentaprism and with a light collector body arranged thereon;

FIG. 6 shows a front view of a roof type pentaprism, with light guide body; and

FIG. 7 shows a roof type pentaprism.

Description of the preferred embodiments

To enable the bright and dark parts of the ground glass screen image, as well as their contrast range, to be measured both singly and jointly, by means of photo-electric cells, the light collector body consisting of transparent material may be constructed as a polygonal prismatic body, with a trapezoidal cross-section. As may be seen from FIGS. 1 to 4, the light entry surface of the light collector body consists of the large trapezoidal surface 1. The right and left lateral surfaces 2 and 3, situated at each end of the large surface 1 and preferably each inclined at an angle of about 45°, may be plane, spherical or cylindrical, according to whether the light guide body takes the form of a column pyramid or cone. The collector body may have a different polygonal ground plan, e.g., triangular or quadrangular. In addition to the surfaces 2 and 3, which are both mirror-coated or, when utilizing the total reflection, non-mirror-coated, so that they reflect the incident light in certain directions, the base surface 4 of the light collector body is likewise mirror-coated. The surface 5 situated opposite to the base surface 4 can be given a special shape and be mirror-coated for the purpose of light reflection, if this is required in order to guide the light rays in a special manner inside the light collector body. Opposite to the light entry surface 1 is the surface 6, which is covered over with a black material in order to prevent penetration of light, so that no false light reaches the photo-electric cell.

According to FIGURES 1 and 2, the light entering the light collector body through light entry surface 1 is reflected from the surfaces 2 and 3 towards the base surface 4 and the lateral walls 14 of a U-shaped cavity 7. Part of the light in the form of a beam I then impinges upon the walls 14 which form light exit surfaces. The remaining light in the form of a beam II impinges upon the base surface 4 and is thereby reflected onto the light exit surfaces 14 and then onto fully reflective top surfaces 13 of the U-shaped cavity 7. The beams II are reflected by the top surfaces 13 onto the photo electric converter within the cavity 7.

As shown in FIG. 3, the fully reflective top surfaces 13 can be replaced by a number of saddle roof type recesses 15 on the upper surface 5 of the light collector body, on the basis of total reflection. The partial light beams I pass, after single reflection, via the surfaces 2 and 3, directly to the converter 8, while the light beams II only pass after multiple reflection via the surfaces 2, 3, 4 and 15 to the same converter 8.

To enable partial measurements to be carried out, e.g., by measuring the bright parts coming from the sky separately from those parts of the light which emanate from a dark subject, two U-shaped cavities 9 and 10, containing photo-electric converters 11 and 12 respectively, are provided in the light collector body, as shown in FIG. 4. The separation of the light reaching the light collector body into light beams I and II is carried out in the same manner as in the example shown in FIG. 1, with the sole difference that the partial light beams I reach the photo-electric converter 12 direct, owing to single reflection on the surfaces 2 and 3, after emerging from the collector body into the cavity 10, while the partial light beams II reach the photo-electric converter 11, owing to multiple reflection on the surfaces 2, 3 and 4, after emerging from the collector body into the cavity 9.

As may be seen from FIG. 2, the lateral walls 14 forming the cavity are spherically, aspherically or cylindrically curved. The resulting optical effect is that the light beams emerging pass in a convergent and guided manner to the photo-electric converter 8. This collecting effect ensures that the size of the light converter employed can be varied within a very small space. To increase the optically convergent effect of the rays reaching the light collector body, the reflection surfaces 2 and 3 or 4 can likewise be spherically or cylindrically curved.

The light collector body may be used for internal exposure measurements in photographic reflex cameras with image deflecting mirror or prism systems. FIG. 5 provides a schematic diagram of a reflex viewfinder device. The light beam coming from the objective lens 20 passes via the mirror 21, to enable the picture to be observed, to the image field lens 23, whence it is observed by the eye 25 of the observer, via the roof type pentaprism 17 and the eyepiece 24. The picture taking plane with the film 26 is situated behind the reflex mirror 21. To ensure that viewfinder light reaches a photo-electric cell or converter situated outside the path of the viewfinder rays, without detracting from the brightness of the viewfinder image during the measuring operation as a result of the reflection of measuring light, the measuring light reaches the converter via those parts of the image erecting surface 16 of the pentaprism 17 on which the viewfinder image does not impinge.

FIG. 7 provides a front view of the pentaprism 17 with the image erecting surface 16. The hatched surface 18, i.e., the surface by which the "laterally correct" image coming from the top surfaces is presented erect to the eye of the observer, is fully mirror-coated, while the surfaces 19 upon which the image does not impinge are unlacquered and non-mirror-coated. Through these clearly transparent surfaces 19, parts of the viewfinder light beam pass into the light collector body provided, with or without an air gap, behind this image erecting surface 16, and onto the photo-electric converter or converters 8 or 11 and/or 12.

FIG. 6 shows the roof type pentaprism 17 with the light collector body provided in front of the image erecting surface 16, with the trapezoidal surfaces 2, 3, 5 and 6 of the said body, and also with the converter 8 provided in the cavity 7. The hatched prism surface 6 is covered over with a black material, thus ensuring that no light, particularly that emanating from the eyepiece, can penetrate this surface, as such light, owing to reflection, would pass through the walls of the housing onto the photo-electric converter 8 and would thus detract from the exposure measuring result.

The light collector body, may be employed in conjunction not only with a pentaprism but also with some other ray reflecting prism system or mirror system.

I claim:
1. A light collector body of prismatic shape, consisting of one piece and having a light entry surface, at least one light exit surface and a plurality of reflection surfaces inclined differently from one another relative to the light entry surface whereby part of the light entering said light entry surface is directed by a single reflection from one of said plurality of reflection surfaces towards the light exit surface whereas the remaining light entering said light entry surface is directed towards said exit surface or a further exit surface after multiple reflection from more than one of said plurality of surfaces.

2. A light collector body as claimed in claim 1, wherein the reflecting surfaces are curved spherically or aspherically or cylindrically.

3. A light collector body as claimed in claim 1 having a base surface and a rear surface, wherein the body is in the form of a polygonal prism of trapezoidal tapering cross-section and wherein a U-shaped cavity is provided in the base surface and between the light entry and rear surfaces to accommodate a photo-electric converter.

4. A light collector body as claimed in claim 1, having a base surface and an upper surface each provided with a U-shaped cavity to accommodate a photo-electric converter.

5. A light collector body as claimed in claim 3, wherein the cavity is provided with totally reflecting top surfaces.

6. A light collector body as claimed in claim 3, wherein the light exit surfaces which define the cavity are curved.

7. A light collector body as claimed in claim 3, having an upper surface provided with at least three saddle roof type recesses with totally reflecting surfaces.

8. In a single-lens reflex photographic camera an objective lens, a pivotable mirror on the optical axis of the objective lens, a pentaprism, an image erecting on the pentaprism, an eyepiece and a photo-electric converter, the provision of a light collector body between the image erecting surface and the photo-electric converter, the body consisting of one piece and having a light entry surface, at least one light exit surface and a plurality of reflection surfaces inclined differently from one another relative to the light entry surface whereby part of the light entering said light entry surface is directed by a single reflection from one of said plurality of reflection surfaces towards the light exit surface whereas the remaining light entering said light entry surface is directed towards said exit surface or a further exit surface after multiple reflection from more than one of said plurality of surfaces.

9. A photographic camera as claimed in claim 8, wherein said image erecting surface has a fully mirror-coated central portion upon which the viewfinder image impinges and has side parts on which the viewfinder image does not impinge and which are non-mirror-coated and non-lacquered whereby light reaches the entry surface of the collector body via said side parts only.

10. A photographic camera as claimed in claim 9, wherein the collector surface situated opposite the light entry surface is covered over with a black material.

References Cited
UNITED STATES PATENTS 3,332,330   7/1967   Broschke _____ 95—42

NORTON ANSHER, Primary Examiner

D. L. MOSES, Assistant Examiner

U.S. Cl. X.R.

95—10